United States Patent [19]
Hou

[11] Patent Number: 6,054,707
[45] Date of Patent: Apr. 25, 2000

[54] PORTABLE SCANNERS CAPABLE OF SCANNING BOTH OPAQUE AND TRANSPARENT MATERIALS

[75] Inventor: Alpha Hou, San Jose, Calif.

[73] Assignee: Syscan Inc., San Jose, Calif.

[21] Appl. No.: 09/127,237

[22] Filed: Jul. 31, 1998

[51] Int. Cl.[7] .................................................. H01J 3/14
[52] U.S. Cl. .......................................... 250/234; 358/475
[58] Field of Search .................................. 250/234, 235, 250/208.1, 216, 566; 358/475, 474, 473, 509; 382/315; 235/462, 472

[56] References Cited

U.S. PATENT DOCUMENTS

| | | | |
|---|---|---|---|
| 5,705,805 | 1/1998 | Han | 250/234 |
| 5,764,493 | 6/1998 | Liao | 362/31 |
| 5,780,829 | 7/1998 | Tsai et al. | 250/234 |
| 5,895,914 | 4/1999 | Tsai | 250/234 |

*Primary Examiner*—Que T. Le
*Attorney, Agent, or Firm*—Joe Zheng

[57] ABSTRACT

Scanners disclosed in the present invention uses a dual-illumination system comprising a front illumination source and a back illumination source. The front illumination source is controlled to illuminate a scanning object when the scanning object is opaque. The back illumination illuminates a scanning object when the scanning object is transparent. An optical system collects lights reflected from the opaque scanning object illuminate by the front illumination source or transmitted through the transparent scanning object illuminated by the back illumination source and focuses the lights upon an image sensor, thereby an image of either the opaque scanning object or the transparent scanning object can be obtained.

20 Claims, 7 Drawing Sheets

PORTABLE SCANNERS CAPABLE OF SCANNING BOTH OPAQUE AND TRANSPARENT MATERIALS

BACKGROUND OF THE INVENTION

1. Field of the Invention

The present invention relates to optical scanners and more particularly relates to a scanning mechanism capable of scanning both opaque and transparent materials, wherein a representative of the opaque materials may be a page from a book and a representative of the transparent materials may be an X-ray film.

2. Description of the Related Art

There are many applications that need optical scanners to convert paper-based objects, such as texts and graphics, to an electronic format that can be subsequently analyzed, distributed and archived. One of the most popular optical scanners is flatbed scanners that typically convert scanning objects, including pictures and papers, to images that can be used, for example, for building World Wide Web pages and optical character recognition. Another emerging optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital format.

Both the flatbed and sheet-fed scanners are designed for scanning sheet-like scanning objects, such as pictures or pages of an article. The scanners generally include a sensing module that is responsible for converting the scanning objects optically into electronic images. The sensing module further includes an illumination system, an optical system, an image sensor and an output circuit. The illumination system is used to illuminate the scanning object that is being scanned. The optical system is used to direct and focus the light reflected from the scanning object onto the image sensor. The image sensor comprises a plurality of photo-diodes or photo-capacitors, referred to as photo-detector hereafter, that are sensitive to light and produce proportional pixel signals accordingly. Therefore corresponding pixel signals are produced in the image sensor when the reflected light is focused thereon and the output circuit is used to convert the pixel signals to an appropriate format to be processed or stored in subsequent systems.

In many cases, there is a need to convert transparent objects, such as negative or positive films, transparencies for a overhead projector or X-ray films, into images so that the information in the transparent objects can be, for example, electronically analyzed, distributed or archived. The conversion is currently done through a specially designed film scanner, often bulky and run by a separate service. As portable scanners are evolving to become an accessory to a laptop computer and more people start to carry a one, there is a great need for a portable scanning device that is capable of scanning not only the regular papers but also the transparent materials. The demand for portable scanners with the dual-scanning capability is ever increasing in both consumer and business markets.

SUMMARY OF THE INVENTION

The present invention has been made in consideration of the above described problems and needs and has particular applications to portable scanners including sheet-fed scanners.

One important aspect of the present invention, which is distinctly differentiated from existing scanners in the market, is that, instead of using one illumination source, the present invention uses front and back illumination sources. The front illumination source is controlled to illuminate a scanning object when the scanning object is opaque. The back illumination source is controlled to illuminate a scanning object when the scanning object is transparent. Further the front illumination source and the back illumination source work conversely, that means when one is on and the other must be off. With this unique control and setting of dual illumination sources, a scanner employing the present invention can scan both opaque and transparent materials.

The representative of opaque scanning objects may include those scanning objects that a regular optical scanner can scan such as pictures or pages from a book or an article. The transparent materials are meant those that can be only observed with reference to a back illumination, such as negative/positive films, X-ray films, mylar films for overhead projectors or films for CAD and photography to name just a few. In the past, the transparent materials have to be scanned by a separate scanning device to be converted to images thereof. With the present invention, a scanning device can now accommodate both opaque and transparent scanning objects, which provides great convenience for users and popularity of scanners in both commercial and consumer markets.

According to one embodiment of the present invention, a portable scanner for optically converting a scanning object to an image thereof, the scanner comprising:

an image sensor;

a front illumination source, the front illumination source providing front illumination to the scanning object when the scanning object is opaque;

a back illumination source, the back illumination source providing back illumination to the scanning object when the scanning object is transparent;

an optical lens system mounted before the image sensor;

wherein the optical lens system collects reflected lights from the opaque scanning object and focuses the reflected lights onto the image sensor so that the image of the opaque scanning object is generated; and wherein the optical lens system collects transmitted lights from the transparent scanning object and focuses the transmitted lights onto the image sensor so that the image of the transparent scanning object is generated.

Accordingly, an important object of the present invention is to provide a generic solution for portable scanning devices that are capable of scanning both opaque and transparent materials.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
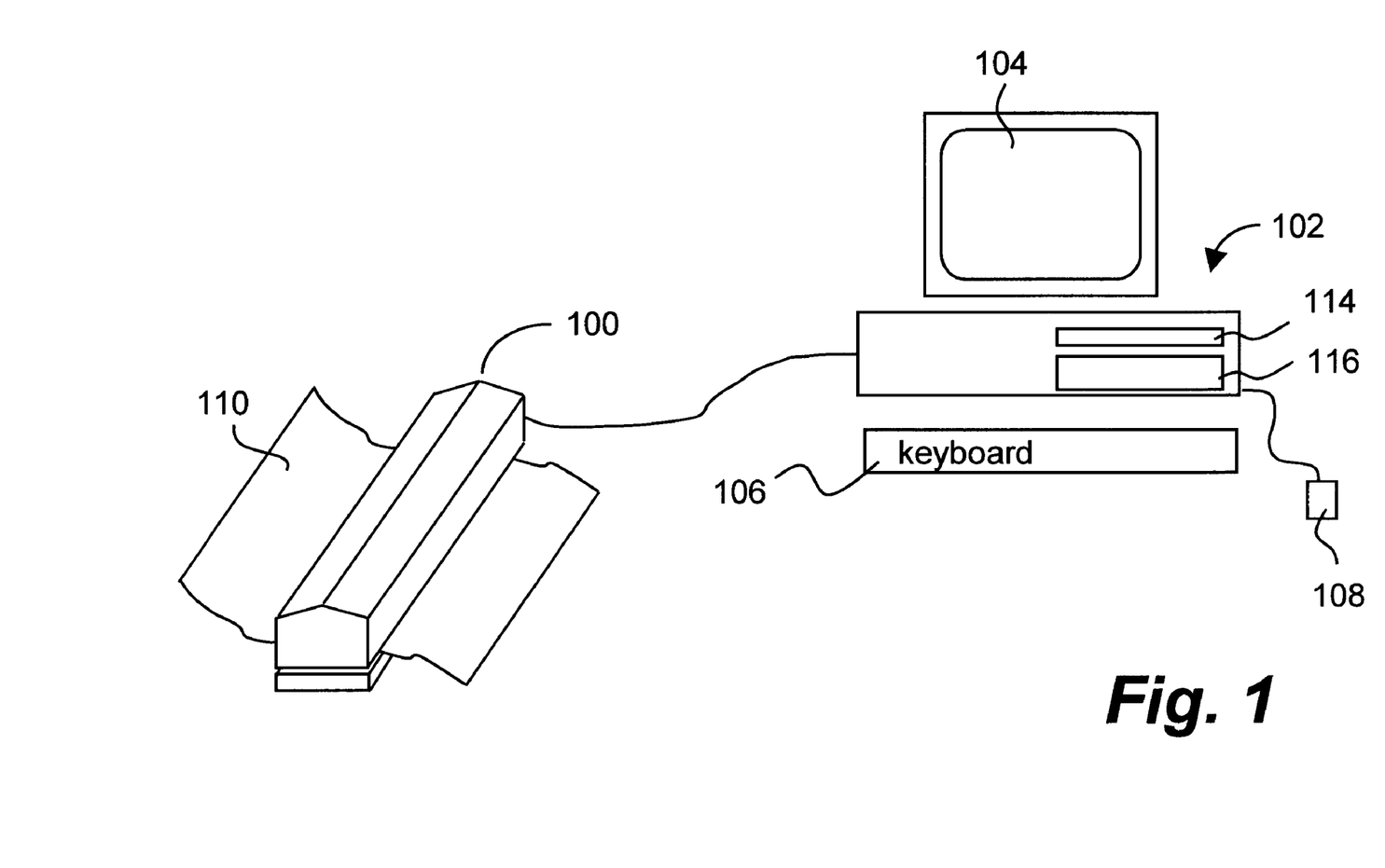
FIG. 1 depicts a schematic diagram showing a scanner application.

Referring now to the drawings, in which like numerals refer to like parts throughout the several views. FIG. 1 shows a schematic diagram embodying a portable scanner application. Scanner 100 is a sheet-fed scanner and connected, through communication cable 112, to computing device 102 which may be an IBM PC or PC-compatible desktop or laptop computer operating under a window operating system, for example, Windows 98 from Microsoft Corporation.

Typically scanner 100 scans a sheet-like scanning object 110, such as a piece of paper or film with text and graphics thereon. The scanning result, generally a digital image, is transferred to computing device 102 through communication cable 112. The image may then be manipulated for desired visual effects by a computer program in computing device 102.

Computing device 102 is provided with a display monitor 104 on which the scanned image or manipulated image can be displayed to users. Computing device 102 is further provided with a floppy disk drive 114 with which removable floppy disk media may be read or written, fixed disk drive 116 for storing image files and application program files, a keyboard 106 for permitting input of text data, such as titles and names for scanned image files, and a pointing device 108 such as a mouse or the like which is also provided to permit execution of commands, for example, to display the scanned and manipulated images on display monitor 104.

Figure 2:
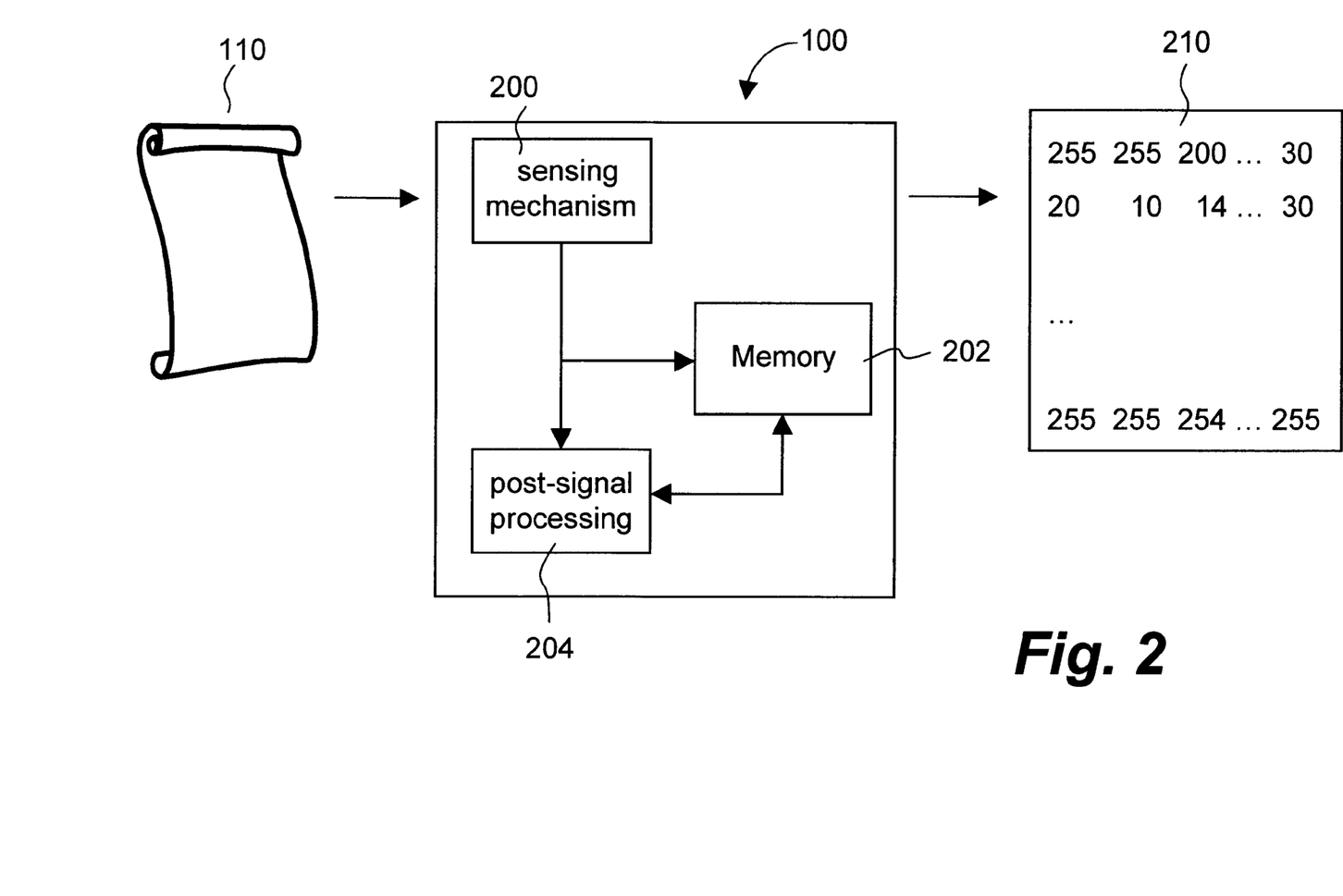
FIG. 2 illustrates a configuration in which the present invention may be practiced.

FIG. 2 shows a systemic diagram of a configuration in which the present invention may be practiced. Scanner 100 converts a scanning object 110 to a corresponding image 210. Fundamentally different from other existing portable scanners in the market, scanner 100 is capable of scanning both opaque and transparent materials. The opaque materials are referred to those scanning objects that a flatbed scanner can scan such as pictures or pages from a book or an article. The transparent materials are meant those such as negative/positive films, X-ray films, mylar films for overhead projectors or films for CAD and photography to name just a few.

In the case of a monochrome scan, image 210 comprises a plurality of pixels, each pixel represented by a numerical value representing the intensity of the light reflectance falling on a sensor in scanner 100 from a corresponding dot in scanning object 110. For example, the scanning object 110 is an 8.5 inch by 11 inch paper or film; the resultant image 210 has a size 850 by 1100 pixels and is in 8-bit format. This means that each square inch of scanning object 110 is represented by 100 by 100 pixels. If all the pixels in the square inch are 255, the corresponding square inch in scanning object 110 is white. Conversely if all the pixels in the square inch are 0, the corresponding square inch in scanning object 110 is dark. It can be understood that any pixels having a value between 0 and 255, i.e. the gray scale, represent the variations of contents in scanning object 110.

When scanner 100 is capable of reproducing colors, image 210 comprises three individual gray scale images, each generally representing one chromatic intensity image, such as red, green and blue intensity images. In other words, each dot in scanning object 110 is represented by a three-intensity-value vector, such as [23, 45, 129], hence image 210 comprising three intensity images.

Scanner 100 comprises a sensing module 200, a memory 202, and a post signal-processing module 204. The operations and principles of memory 202 and post signal-processing module 204 are known to those skilled in the art. Further the present invention is preferably embodied in sensing module 200, therefore other hardware or processes in scanner 100 are not to be described in detail to avoid unnecessarily obscuring aspects of the present invention.

Figure 3:
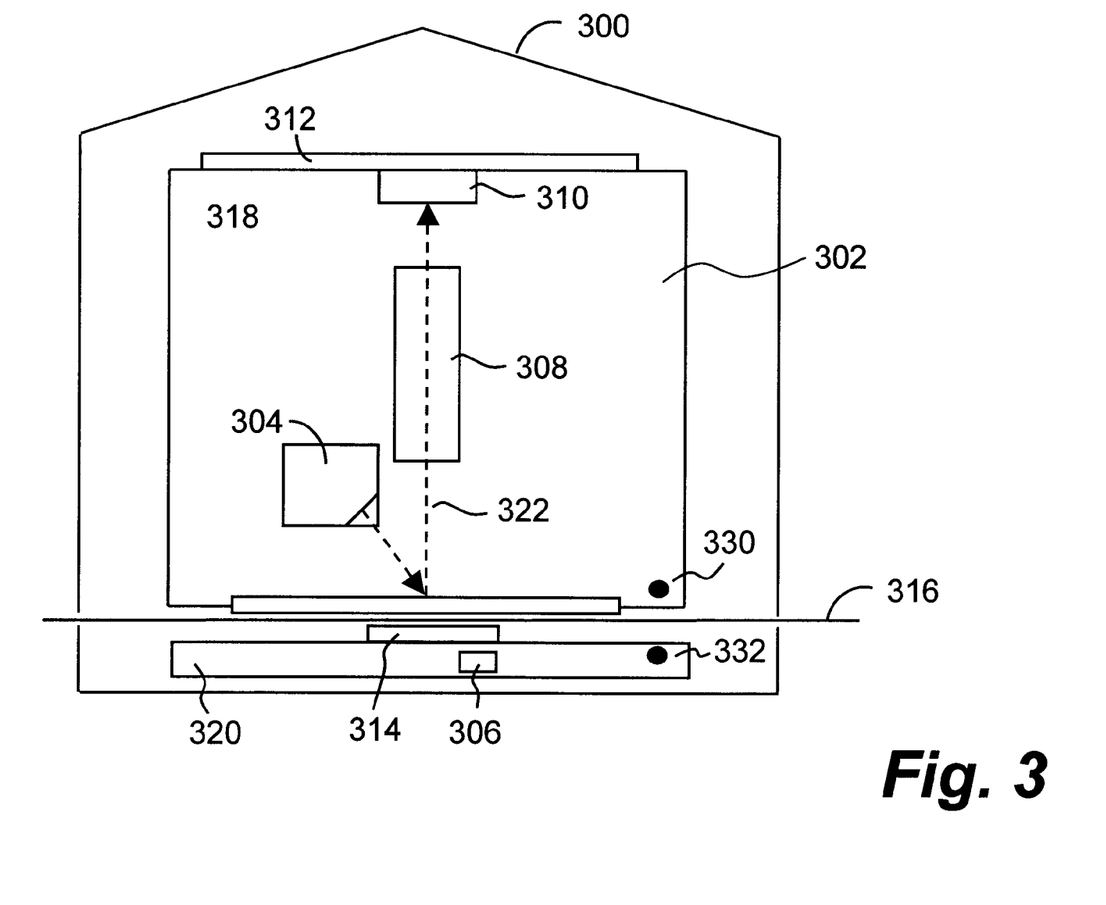
FIG. 3 illustrates a side view of a sensing module employing the present invention according to one embodiment of the present invention.

FIG. 3 is a side view of a sheet-fed style portable scanner according to one embodiment of the present invention. Reflected graphically in FIG. 1, casting or case 300 provides a compartment that houses a sensing module 302. Preferably, casting 300 is made of a light but solid plastic material and provides enough space to house all components therein. It should be pointed out, however, that the packaging or shape of the scanner does not affect the operations of the present invention and is indeed an implementation preference. Those skilled in the art will appreciate that the present invention works more efficiently in those portable sheet-fed style scanners but can be applied equally well in other appropriate scanners.

As shown in this figure, sensing module 200, consisting of an upper module 318 and a bottom module 320, comprises an illumination system comprising two illumination sources 304 and 306, an optical system 308, and an image sensor 310. Casing 300 is provided to integrate all the components in an enclosed compartment according to one embodiment of the present invention. The illumination system comprises a front illumination source 304 and a back illumination source 306. The combined front and back illumination sources 304 and 306 is one of the features in the present invention and the utilities thereof will be soon appreciated by those skilled in the art.

According to one embodiment of the present invention, front illumination source 304 in upper module 318 comprises light emitting diodes, preferably a red (LED), a green LED, and a blue LED, each can be independently and respectively turned on and off. Scanning object 316 may be a sheet of paper or film and rolled in by a motion mechanism through a gap between upper module 318 and bottom module 320. The gap, typically, one eighth of an inch, is formed to let scanning object 316 pass through an optical path 322. In other words, image sensor 310 is focused at optical path by optical lens 308, anything passing through optical path 322 will be imaged by image sensor 310 after a command to start the scanning operation is executed. One of the important distinctions from other scanners that may scan both opaque and transparent materials is that the scanning object, regardless opaque or transparent, is provided at the same scanning path.

The motion mechanism, not shown in the figure, causes scanning object 316 to move from one end to another end, passing optical path 322, so that image sensor 310 can image or scan the scanning object 316. According to one embodiment of the present invention, the motion mechanism comprises a motor and a roller. The motor, preferably a step motor, works in synchronization with image sensor 310 and the roller having a rubber-like surface is driven by the motor. Scanning object 316 is thus carried by the roller and moved through image sensor 310 from one opening to another opening of casting 300.

As described below, front illumination source 304 is for opaque scanning materials while back illumination source 306 is for transparent scanning object. When front illumination source 304 is turned on and (opaque) scanning object 316 is passed through the image sensor 310, the entire front face of scanning object 316 is successively illuminated and hence imaged. It can be appreciated that, for every scanning line of scanning object 316, front illumination source 304 turns on alternatively each of the color lights therein, so the image sensor 310 can produce corresponding intensity images. For example, when a red light in front illumination source 304 is turned on, one line of scanning object 316 is imaged by image sensor 310. The same line of scanning object 316 is imaged when a green light and a blue light in front illumination source 304 are respectively turned on.

Figure 4A:
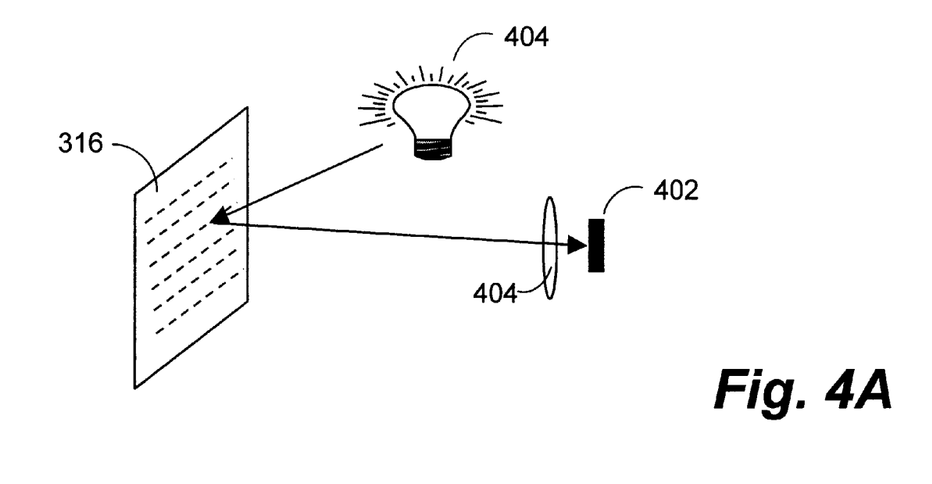
FIG. 4A and FIG. 4B depict respectively a pictorial view of front illumination and back illumination with respect to an image sensor.
Figure 4B:
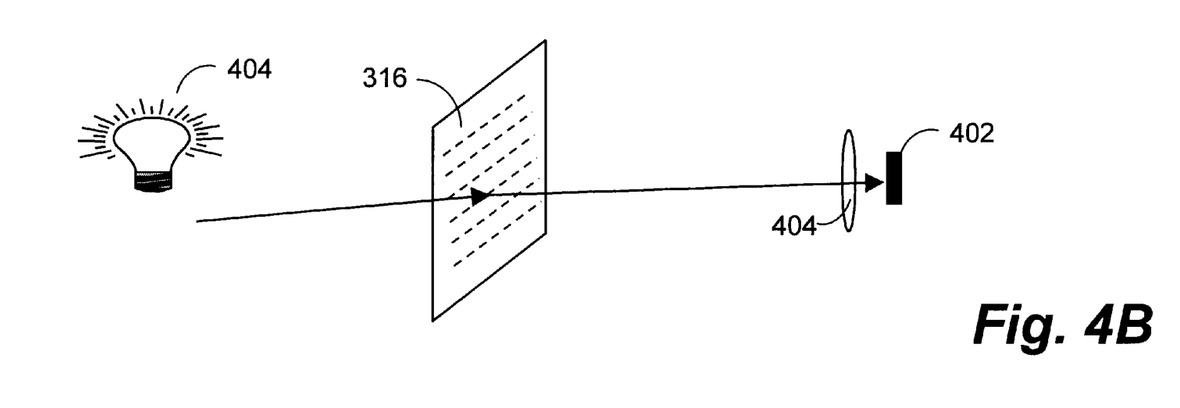

To scan a scanning object that is transparent, back illumination must be provided. Compared to the front illumination, the back illumination provides illumination from the back of the transparent scanning object. FIGS. 4A and 4B demonstrate respectively the front illumination for an opaque scanning object and the back illumination for a transparent scanning object. In FIG. 4A, scanning object 316 is an opaque scanning material, such as a page, having a front surface facing to image sensor 400. Illumination source 404 illuminates the front surface, light reflected from the surface is collected by optical lens 404 and focused upon image sensor 400 so that an image of the surface is obtained. In FIG. 4B, scanning object 316 is a transparent scanning material, such as a film. Illumination source 404 provides illumination from the back of transparent scanning object 316 such that light through transparent scanning object 316, namely transmitted light, is collected by optical lens 404 and focused upon image sensor 400 so that an image of the transparent scanning object is obtained. Illumination 404 in FIG. 4A and FIG. 4B corresponds respectively to front illumination source 304 and back illumination source 306.

Returning to FIG. 3, it can be appreciated that back illumination source 306 is turned on when (transparent) scanning object 316 is present between upper module 302 and bottom module 320. Back illumination source 306 is preferably a white light source. According to one embodiment, back illumination source 306 is an elongated light guide having a length comparable to a width of scanning object 316 so that every scanning line of scanning object 316 can be evenly illuminated. The light guide may be made from a fluorescent light source or three distinct color light source as described more below. It should be pointed out that the characteristics of the front and back illumination sources do not directly affect the operations of the present invention. One of the key features of the present invention is that the front and back illumination sources work conversely, namely only one is turned on when a scanning object is present therein. In other words, one is turned off when the other one is turned on.

Accordingly to another embodiment of the present invention, a pair of light source (emitter) 330 and photodetector 332 is used to detect if scanning object 316 is opaque or transparent. Preferably, light source 330 and photodetector 332 are aligned so that photodetector 332 is always activated by light source 330. When an opaque sheet is inserted into the scanning gap between upper module 318 and bottom module 320, photodetector 332 becomes inactivated because of the blocked light source 330 by the opaque sheet. A control circuit, not shown in the figure and understood to those skilled in the art, can automatically turn on front illumination source 304. Similarly, when a transparent sheet is inserted into the scanning gap, photodetector 332 remains activated because light source 330 can go through the transparent sheet. Therefore the same control circuit can automatically turn on back illumination source 306.

It can be appreciated by those skilled in the art that there are many other ways that can instruct the control circuit to turn on the appropriate illumination source for the right scanning object. One of the ways is simply based on a manual determination. In other words, there can be installed a button accessible by a user of the scanner, the front illumination source is a default selected illumination source for all scanning objects. When the user has a transparent sheet to scan, the button can be pressed to activate the back illumination source and meanwhile turn off the front illumination so that a proper illumination light source is always provided.

Figure 5A:
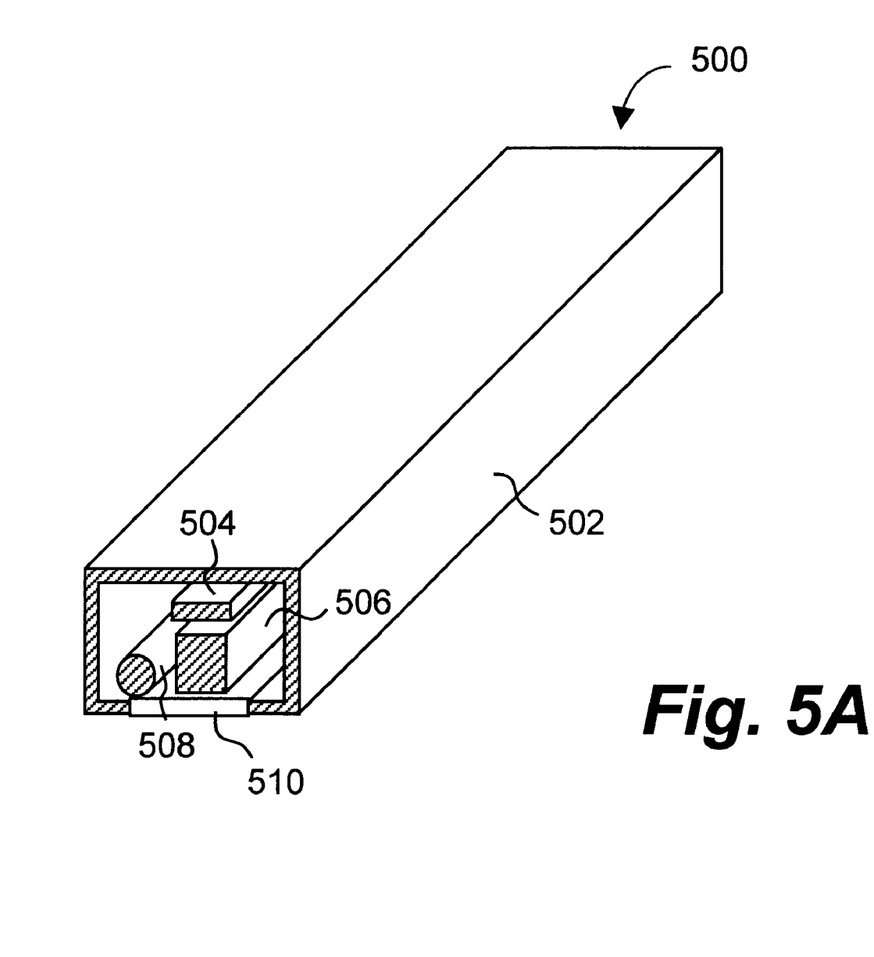
FIG. 5A illustrates a cross-section view of a contact image sensor used in the present invention.

According to one embodiment, upper module 318 is a contact image sensor. The contact image sensor is an elongated tubular casting integrating the image sensor and the optical lens therein. Optionally the contact image sensor may include the front illumination source. Referring to FIG. 5A, there is shown a cross-section view of an exemplary contact image sensor 500 that may correspond to upper module 318 of FIG. 3. Contact image sensor 500 comprises an image sensor 504, an optical lens system 506 and a front illumination source 508, all integrated in a tubular casting 502. Tubular casting 502 or contact image sensor 500 may be extended to accommodate the maximum width of a scanning object. For example, a scanner is designed to scan a sheet size of 8.5 by 11 inches, therefore contact image sensor 500 may have a length of 9 inches to account for the margins. Image sensor 504 is typically a linear sensor having a density of 300 photodetectors per inch. Optical lens (system) 506 is generally an array of one-to-one erect graded index micro (cylindrical or rod) lens and front illumination source 508 comprises fundamental three color lights, such as red, green and blue LED. It should be understood that the present invention is independent of the characteristics of the optical lens and the lights in contact image sensor 500. The cylindrical lens and LED-based front illumination source used herein is just to show one example using the present invention. In one embodiment of the present invention, contact image sensor 500 is a CIS 100, obtained from ScanVision, Incorporated having a business of 1346 Ridder Park Drive, San Jose, Calif. 95131, USA.

Figure 5B:
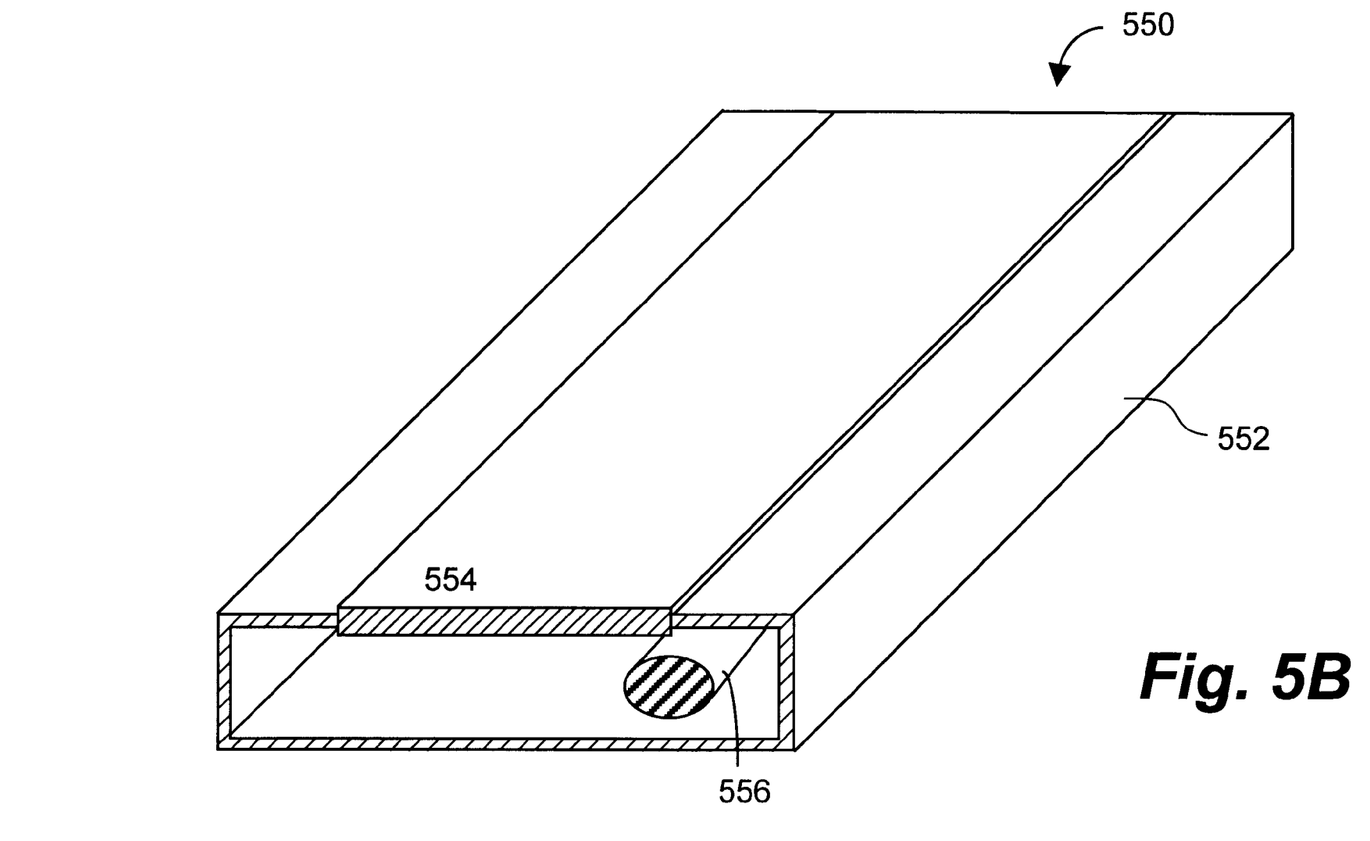
FIG. 5B illustrates a cross-section view of a back illumination source used in the present invention.

FIG. 5B illustrates a cross-section view of a back illumination module 550 that may correspond to bottom module of FIG. 3. Back illumination module 550 ideally has the same length as the upper module 318 of FIG. 3 or contact image sensor 500 of FIG. 5A. According to one embodiment, back illumination module 550 provides a modular back illumination source that includes a light source 552 therein. Light source 552 can be a fluorescent light source or three different color light sources, typically a red LED, a green LED and a blue LED. When light source 552 is a fluorescent light source, it can be appreciated that the resultant image of a transparent scanning object will be a gray-level image. When light source 552 is from color light sources, like the front illumination source, each of the colored lights is respectively and successively turned on so that three color intensity images are generated. To provide an even illumination to a transparent scanning object, upper surface 554 is preferably a diffused material (sheet) so that lighting from light source 556 through diffusing sheet 554 is evenly distributed. As described above, front illumination source 508 of FIG. 5A and light source 556 in back illumination module 550 work conversely, namely only one of the illumination sources is on at one time depending on weather the scanning object is opaque or transparent.

Figure 6:
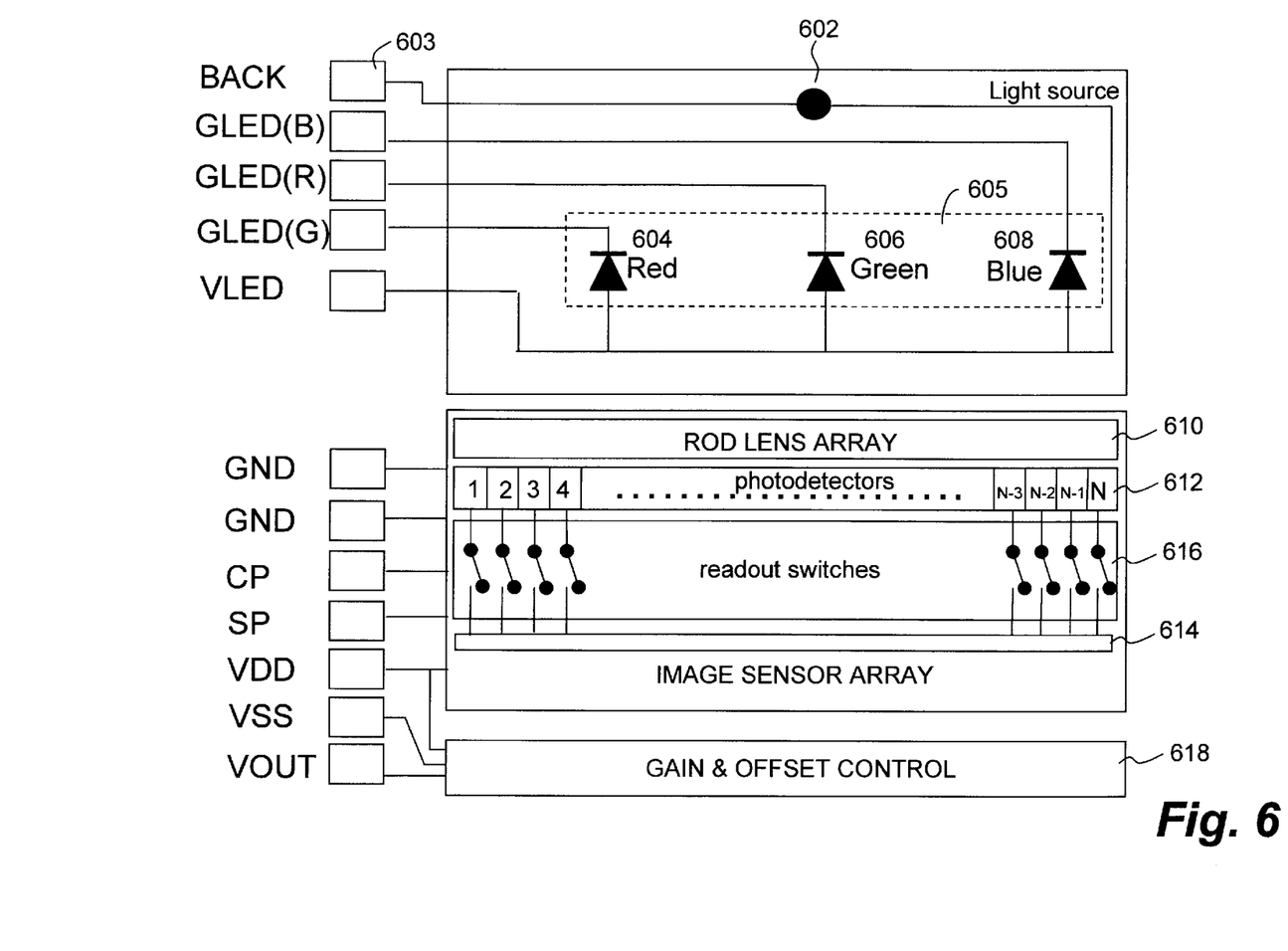
FIG. 6 shows the internal functional diagram of a sensing module according to one embodiment of the present invention.

To further understand the principles of the present invention, FIG. 6 shows the internal functional diagram of sensing module 300 according to one embodiment of the present invention. As illustrated, there are two illumination source, first one 602 is for back illumination and second one 604, 606 and 608 are for front illumination. Back illumination source 602 may be a LED or a light guide or tubular light source of FIG. 5B, controlled by an "ON" signal at connector 603. The front illumination source comprises a red LED 604, a green LED 606 and a blue LED 608, each controlled respectively by an "ON" signal at respective connectors 402, 404, and 406. As described above, either illumination source 602 is turned "ON" for a transparent scanning object or the LEDs are successively turned "ON" for an opaque scanning object.

The rod lens array 610 collects either the reflected light from the opaque scanning object illuminated by one of red LED 604, green LED 606 and blue LED 608 or transmitted light from the transparent scanning object illuminated by back illumination source 602 and focuses the light onto image sensor 612. Image sensor 612 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 614 as a scanning signal via readout switch array 616. It should be noted that image sensor 612 is assumed a CMOS type sensor and those skilled in the art will understand that the description works the same for CCD type sensors.

Switch array 616 comprises the same number of the readout switches as the number of the photodetectors in the image array 120. It is understood to those skilled in the art that each of the readout switches may be implemented by a diode that becomes "On" or "passing through" when a proper voltage is applied across. As shown in the figure, the scanning signal is coupled to a gain & offset control circuit 618. The scanning signal is processed, including amplified and offset, in gain & offset control circuit 618 with respect to a desired adjustment and subsequently output as a video signal at $V_{out}$.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A portable scanner for optically converting a scanning object to an image thereof, said scanner comprising:
    an image sensor;
    a front illumination source, said front illumination source providing front illumination to said scanning object when said scanning object is opaque;
    a back illumination source, said back illumination source providing back illumination to said scanning object when said scanning object is transparent;
    an optical lens system mounted in front of said image sensor; said scanning object provided in a same scanning passage, regardless of being opaque or transparent, in front of the optical lens;
    wherein said optical lens system collects reflected lights from said opaque scanning object and focuses said reflected lights onto said image sensor so that said image of said opaque scanning object is generated; and
    wherein said optical lens system collects transmitted lights from said transparent scanning object and focuses said transmitted lights onto said image sensor so that said image of said transparent scanning object is generated.

2. The portable scanner as recited in claim 1 further comprising a motion mechanism moving said scanning object past said optical lens system so that said scanning object is fully scanned by said image sensor.

3. The portable scanner as recited in claim 1, wherein said image sensor is a contact image sensor module, said contact image sensor module comprising said image sensor, said front illumination source and said optical lens system.

4. The portable scanner as recited in claim 1, wherein said back illumination source is a light guide comprising a florescent light source therein.

5. The portable scanner as recited in claim 1, wherein said back illumination source is a light guide comprising different color lights, each of said color lights being, respectively and successively, turned on to scan said scanning object so as to produce intensity images for said each of said color lights.

6. A portable scanner for optically converting a scanning object to an image thereof, said scanner comprising:
    an image sensing module statically integrated within said portable scanner; said image sensing module comprising an image sensor, an optical lens system and a front illumination source;
    a back illumination module; said back illumination module comprising a light source, said light source working conversely with said front illumination source in said image sensing module;
    said image sensing module and said back illumination module integrated in parallel and forming a scanning gap therebetween; and
    a motion mechanism rolling said scanning object through said scanning gap regardless said scanning object is opaque or transparent so that said scanning object can be completely scanned by said image sensor via said optical lens system in said image sensing.

7. The portable scanner as recited in claim 6, said portable scanner further comprising means for detecting whether said scanning object is opaque or transparent.

8. The portable scanner as recited in claim 7, wherein said front illumination source is turned on to provide front illumination to said scanning object when said detecting means indicates that said scanning object is opaque.

9. The portable scanner as recited in claim 8, wherein said back illumination source is turned on to provide back illumination to said scanning object when said detecting means indicates that said scanning object is transparent.

10. The portable scanner as recited in claim 6,
    wherein said image sensing module is a contact image sensor integrating said image sensor, said optical lens system and said front illumination source therein; and
    wherein said back illumination module is a light guide.

11. The portable scanner as recited in claim 10, wherein both said image sensing module and said back illumination module have a respective extended length to accommodate the width of said scanning object.

12. A portable scanner for optically converting a scanning object to an image thereof, said scanner comprising:
- a portable case made of light and solid material; said case having an elongated receiving opening and an elongated exiting opening;
- an elongated contact image sensor statically integrated within said portable case and having an extended length to accommodate the width of said scanning object; said contact image sensor comprising an photodetector sensor, an optical lens system and an illumination source therein;
- an elongated back illumination module;
- said contact image sensor and said back illumination module housed in said portable case and positioned spaced apart to form a scanning passage gap to receive said scanning object regardless said scanning object is opaque or transparent; said passage gap communicating with both said receiving opening and said exiting opening; and
- a motion mechanism rolling said scanning object received in from said receiving opening and out of said exiting opening so that said photodetector sensor in said image sensor can image said scanning object via said optical lens system.

13. The portable scanner as recited in claim 12, further comprising means for detecting whether said scanning object is opaque or transparent.

14. The portable scanner as recited in claim 13, wherein said detecting means comprises a photodetector and a light emitter, said photodetector being activated when said photodetector sees said light emitter.

15. The portable scanner as recited in claim 13, wherein said detecting means is a manual button.

16. The portable scanner as recited in claim 13,
- wherein said illumination source in said contact image sensor illuminates said scanning object when said scanning object is passed through and said detecting means indicates that said scanning object is opaque, and
- wherein said optical lens systems collects reflected light from said scanning object and focuses said reflected light upon said photodetector sensor in said image sensor.

17. The portable scanner as recited in claim 16,
- wherein said back illumination module illuminates said scanning object when said scanning object is passed through and said detecting means indicates that said scanning object is transparent, and
- wherein said optical lens systems collects transmitted light through said scanning object and focuses said transmitted light upon said photodetector sensor in said image sensor.

18. The portable scanner as recited in claim 17, wherein said back illumination module is a light guide providing diffused light to said scanning object.

19. The portable scanner as recited in claim 18, wherein said back illumination module comprises a florescent light source and a diffused sheet, said diffused light provided by said florescent light source through said diffused sheet.

20. The portable scanner as recited in claim 18, wherein said back illumination module comprises colored lights, each turned on respectively and successively.

* * * * *